US012738875B2

(12) United States Patent
Shi et al.

(10) Patent No.: US 12,738,875 B2
(45) Date of Patent: Sep. 15, 2026

(54) AIR CONDITIONER AND METHOD FOR DETERMINING ENERGY CONSUMPTION OF AIR CONDITIONER

(71) Applicant: QINGDAO HISENSE HITACHI AIR-CONDITIONING SYSTEMS CO., LTD., Qingdao (CN)

(72) Inventors: Jingfeng Shi, Qingdao (CN); Lei Shi, Qingdao (CN); Qiang Chen, Qingdao (CN); Haibin Lu, Qingdao (CN); Fali Cao, Qingdao (CN)

(73) Assignee: QINGDAO HISENSE HITACHI AIR-CONDITIONING SYSTEMS CO., LTD., Qingdao (CN)

( * ) Notice: Subject to any disclaimer, the term of this patent is extended or adjusted under 35 U.S.C. 154(b) by 844 days.

(21) Appl. No.: 18/116,089

(22) Filed: Mar. 1, 2023

(65) Prior Publication Data

US 2023/0261600 A1 Aug. 17, 2023

Related U.S. Application Data

(63) Continuation-in-part of application No. PCT/CN2021/081678, filed on Mar. 19, 2021, and a
(Continued)

(30) Foreign Application Priority Data

Sep. 2, 2020 (CN) ........................ 202010909922.X
Oct. 22, 2020 (CN) ........................ 202011141298.X

(51) Int. Cl.
*H02P 27/04* (2016.01)
*F24F 11/46* (2018.01)
*H02M 1/42* (2007.01)

(52) U.S. Cl.
CPC ............ *H02P 27/047* (2013.01); *F24F 11/46* (2018.01); *H02M 1/4208* (2013.01)

(58) Field of Classification Search
CPC ...... H02P 27/047; F24F 11/46; H02M 1/4208
(Continued)

(56) References Cited

U.S. PATENT DOCUMENTS 7,521,887 B2 * 4/2009 Tobari ..................... H02P 21/16
318/717
8,353,174 B1 * 1/2013 Jadric ................... F25B 49/025
700/28
(Continued)

FOREIGN PATENT DOCUMENTS

CN 101257243 A 9/2008
CN 101509694 A 8/2009
(Continued)

OTHER PUBLICATIONS

First Chinese Office Action mailed Nov. 26, 2021 in corresponding Chinese Application No. 202011141298.X, translated, 19 pages.
(Continued)

*Primary Examiner* — Kawing Chan
(74) *Attorney, Agent, or Firm* — MH2 Technology Law Group LLP

(57) ABSTRACT

An air conditioner includes a controlled device, a frequency converter, and a controller. The controller is configured to: determine a present operating frequency of the controlled device, and a present output current and a present input power of the frequency converter; determine a present efficiency of the frequency converter according to the present operating frequency of the controlled device and the present output current of the frequency converter; and determine a present input power of the frequency converter according to the present efficiency of the frequency con-
(Continued)

verter and the present output power of the frequency converter.

16 Claims, 9 Drawing Sheets

Related U.S. Application Data continuation-in-part of application No. PCT/CN2021/081677, filed on Mar. 19, 2021.

(58) Field of Classification Search
USPC .......................................................... 318/801
See application file for complete search history.

(56) References Cited

U.S. PATENT DOCUMENTS

| | | | |
|---|---|---|---|
| 2016/0109145 | A1 | 4/2016 | Liu et al. |
| 2017/0320479 | A1 | 11/2017 | Praxmarer et al. |

FOREIGN PATENT DOCUMENTS

| | | | | | |
|---|---|---|---|---|---|
| CN | 202778717 | U | * | 3/2013 | |
| CN | 103236816 | A | | 8/2013 | |
| CN | 104633857 | A | | 5/2015 | |
| CN | 106123251 | A | | 11/2016 | |
| CN | 106458220 | A | | 2/2017 | |
| CN | 104214886 | B | * | 3/2017 | |
| CN | 106556112 | A | | 4/2017 | |
| CN | 106871391 | A | | 6/2017 | |
| CN | 107064616 | A | | 8/2017 | |
| CN | 107423477 | A | | 12/2017 | |
| CN | 107472078 | A | | 12/2017 | |
| CN | 108799125 | A | | 11/2018 | |
| CN | 109061466 | A | | 12/2018 | |
| CN | 109140678 | A | | 1/2019 | |
| CN | 106123251 | B | * | 9/2019 | |
| CN | 110489884 | A | | 11/2019 | |
| CN | 111950158 | A | | 11/2020 | |
| CN | 112032938 | A | | 12/2020 | |
| CN | 112367003 | A | | 2/2021 | |
| CN | 112532129 | A | * | 3/2021 | ............ H02P 27/085 |
| JP | H04145256 | A | | 5/1992 | |
| JP | H06276797 | A | | 9/1994 | |
| JP | 2001277906 | A | | 10/2001 | |
| JP | 2004129357 | A | | 4/2004 | |
| JP | 2009280012 | A | | 12/2009 | |
| JP | 2014155238 | A | | 8/2014 | |
| KR | 20170011611 | A | | 2/2017 | |
| KR | 102064173 | B1 | * | 1/2020 | ........... G01R 31/343 |
| WO | 2008057810 | A2 | | 5/2008 | |

OTHER PUBLICATIONS

Chinese Notification to Grant Patent Right for Invention mailed May 19, 2022 in corresponding Chinese Application No. 202011141298.X, translated, 7 pages.

First Chinese Office Action mailed Jul. 5, 2021 in corresponding Chinese Application No. 202010909922.X, translated, 16 pages.

Second Chinese Office Action mailed Feb. 9, 2022 in corresponding Chinese Application No. 202010909922.X, translated, 15 pages.

International Search Report and Written Opinion mailed Jun. 17, 2021 in corresponding International Application No. PCT/CN2021/081678, translated, 17 pages.

Zhongmin Liu et al., “A High-Accuracy Semi-Empirical Compressor Model For Air-Conditioning System Simulation,” Refrigeration, vol. 37, No. 2, Jun. 15, 2018, translated, 16 pages.

Huaiyi Yang et al., “Performance Monitoring Method of Air-conditioning System based on Limited Measuring Points,” Journal of Refrigeration, vol. 39, No. 6, Dec. 16, 2018, translated, 27 pages.

International Search Report and Written Opinion mailed Jul. 21, 2021 in corresponding International Application No. PCT/CN2021/081677, translated, 19 pages.

Chinese First Office Action dated Nov. 14, 2025 in corresponding Chinese Application No. 202180039601.1, translated, 13 pages.

* cited by examiner

AIR CONDITIONER AND METHOD FOR DETERMINING ENERGY CONSUMPTION OF AIR CONDITIONER

CROSS-REFERENCE TO RELATED APPLICATIONS

This application is a continuation-in-part of International Application No. PCT/CN2021/081677, with an international filing date of 19 Mar. 2021, which claims priority to Chinese Patent Application No. 202011141298.X, filed on 22 Oct. 2020; and this application is a continuation-in-part of International Application No. PCT/CN2021/081678, with an international filing date of 19 Mar. 2021, which claims priority to Chinese Patent Application No. 202010909922.X, filed on 2 Sep. 2020, the entire contents of which are hereby incorporated by reference herein.

TECHNICAL FIELD

The present disclosure relates to the technical field of household appliances, and in particular, to an air conditioner and a method for determining energy consumption of an air conditioner.

BACKGROUND

In recent years, people's awareness of energy conservation has been continuously enhanced. The air conditioner can detect its energy consumption in real time, and adjust parameters of each device in the air conditioner according to its energy consumption, so that the air conditioner can provide a power saving function.

SUMMARY

In one aspect, some embodiments of the present disclosure provide an air conditioner including a controlled device, a frequency converter, and a controller. The frequency converter is connected to the controlled device and is configured to regulate an operating frequency of the controlled device. The controller is connected to the frequency converter and is configured to: determine a present operating frequency of the controlled device, and a present output current and a present output power of the frequency converter determine a present efficiency of the frequency converter according to the present operating frequency of the controlled device and the present output current of the frequency converter; and determine a present input power of the frequency converter according to the present efficiency of the frequency converter and the present output power of the frequency converter.

In another aspect, some embodiments of the present disclosure provide a method for determining energy consumption of an air conditioner, and the method is executed by a controller. The method includes: determining a present operating frequency of the controlled device, and a present output current and a present output power of the frequency converter; determining a present efficiency of the frequency converter according to the present operating frequency of the controlled device and the present output current of the frequency converter; and determining a present input power of the frequency converter according to the present efficiency of the frequency converter and the present output power of the frequency converter.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings in some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of signals involved in the embodiments of the present disclosure.

Figure 1:
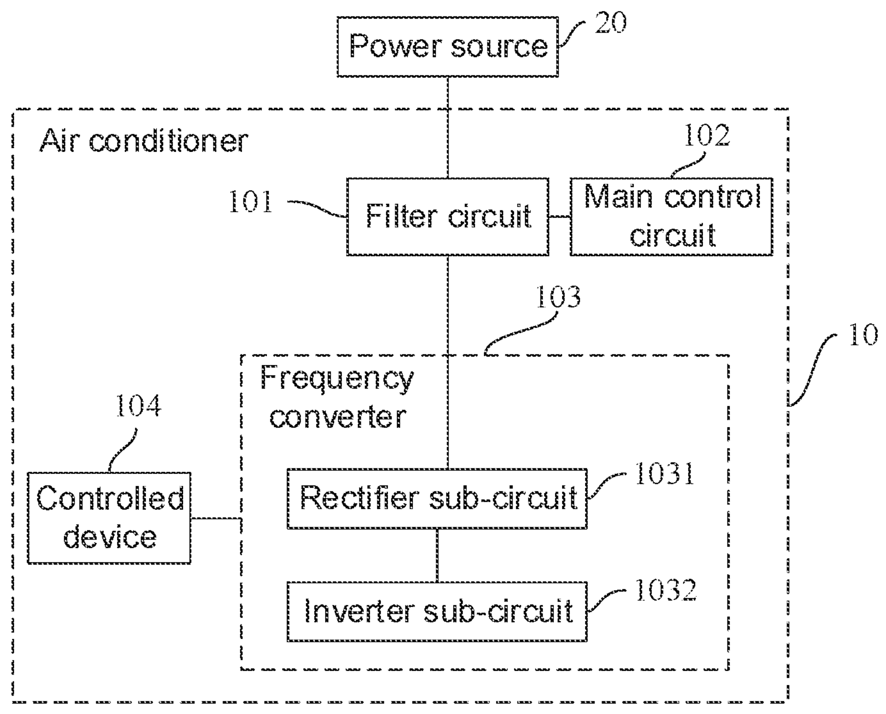
FIG. 1 is a block diagram of an air conditioner, in accordance with some embodiments.

It should be noted that, the terms "obtain," "obtains," "obtaining," and "obtained" have same or similar means as the terms "determine," "determines," "determining," and "determined" in the text.

DETAILED DESCRIPTION

The technical solutions in the embodiments of the present disclosure will be described clearly and completely with reference to the accompanying drawings in the embodiments of the present disclosure; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are only used for descriptive purposes and cannot be construed as indicating or implying the relative importance or implicitly indicating the number of indicated technical features. Therefore, features defined with "first" and "second" may explicitly or implicitly include one or more of these features. In the description of the embodiments of the present disclosure, the terms "a plurality of" and "the plurality of" each mean two or more unless otherwise specified.

In the description of some embodiments, the expressions "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of the phrase "applicable to" or "configured to" herein means an open and inclusive expression, which does not exclude devices that are applicable to or configured to perform additional tasks or steps.

Generally, an air conditioner includes an outdoor unit and an indoor unit. The indoor unit is generally installed in indoor space and the outdoor unit is generally installed outdoors. The outdoor unit may include a compressor, an outdoor heat exchanger, and an outdoor fan, and the indoor unit includes an indoor heat exchanger. Either of the indoor heat exchanger and the outdoor heat exchanger may be any of a surface heat exchanger, a regenerative heat exchanger, a fluid connection indirect heat exchanger, and a direct contact heat exchanger, and other types of heat exchangers are also contemplated within the scope of the present disclosure. The air conditioner further includes an expansion valve, and the expansion valve may be disposed in the indoor unit or the outdoor unit.

During the operation of the air conditioner, a cyclic process of regulating temperature may include a compression process, a condensation process, an expansion process, and an evaporation process. In the compression process, the compressor compresses a low-temperature and low-pressure gas-phase refrigerant into a high-temperature and high-pressure gas-phase refrigerant. In the condensation process, the high-temperature and high-pressure gas-phase refrigerant enters a condenser and is condensed into a liquid-phase refrigerant, during which heat is released. In the expansion process, the liquid-phase refrigerant passes through the expansion valve and is expanded into a low-pressure liquid-phase refrigerant. In the evaporation process, the low-pressure liquid-phase refrigerant enters the evaporator, absorbs heat in the environment, and is evaporated into a low-temperature and low-pressure gas-phase refrigerant. The low-temperature and low-pressure gas-phase refrigerant may return to the compressor and go on to a compression process of a next cycle. The circulation of refrigerant in the compressor, the condenser, the expansion valve, and the evaporator enables the air conditioner to regulate the temperature of the indoor space.

In different operating conditions of the air conditioner, either of the indoor heat exchanger and the outdoor heat exchanger may be used as a condenser or an evaporator. For example, in a case where the air conditioner is used to increase the temperature of the indoor space, the indoor heat exchanger serves as a condenser to operate in the condensation process, and the outdoor heat exchanger serves as an evaporator to operate in the evaporation process. For example, in a case where the air conditioner is used to reduce the temperature of the indoor space, the indoor heat exchanger serves as an evaporator to operate in the evaporation process, and the outdoor heat exchanger serves as a condenser to operate in the condensation process. The outdoor fan allows heat displaced by the outdoor heat exchanger to enter the external environment rapidly.

The air conditioner may further include a frequency converter, and the frequency converter is used to regulate a rotational speed of an outdoor fan motor or the compressor. For example, the frequency converter may adjust an operating voltage of the outdoor fan motor or the compressor and then regulate the rotational speed of the outdoor fan motor or the compressor, so as to achieve a purpose of energy conservation.

Generally, in a case where the indoor temperature is in a certain temperature range (e.g., the indoor temperature in summer is in a range from 25° C. to 27° C.), there is little difference in the comfort level felt by the user. However, in two cases where the user sets an operating target temperature of the air conditioner to a low temperature (e.g., 25° C.) and a high temperature (e.g., 27° C.), the power consumption of the air conditioner is different. By detecting the energy consumption of the air conditioner in real time and adjusting operating parameters of the air conditioner according to the energy consumption of the air conditioner, it is possible to achieve the purpose of energy conservation and increase a service life of the air conditioner.

In some embodiments, as shown in FIG. 1, the air conditioner 10 may include a filter circuit 101, a main control circuit 102, a frequency converter 103, and a controlled device 104. The controlled device 104 may be a compressor, an outdoor fan motor, or other electrical devices regulated by the frequency converter 103. The frequency converter 103 may include a rectifier sub-circuit 1031 and an inverter sub-circuit 1032. For example, the frequency converter 103 and the controlled device 104 are generally disposed in the outdoor unit. The filter circuit 101 or the main control circuit 102 may be disposed in the indoor unit and may also be disposed in the outdoor unit; or the main control circuit 102 may include two control circuits provided in the indoor unit and the outdoor unit respectively. The present disclosure does not limit an arrangement position of the filter circuit 101 or the main control circuit 102.

The air conditioner 10 may be connected to a power source 20, which may provide an alternating current for the air conditioner 10. The filter circuit 101 may filter the alternating current from the power source 20 to obtain a filtered alternating current. The filtered alternating current may flow to the main control circuit 102, so that the main control circuit 102 controls the operation of the air conditioner 10. The filtered alternating current may also flow to the rectifier sub-circuit 1031, so that the rectifier sub-circuit circuit 1031 rectifies the filtered alternating current to obtain a direct current. The direct current may flow to the inverter sub-circuit 1032, so that the inverter sub-circuit 1032 may convert the direct current into an alternating current that is adjustable in frequency and voltage. The frequency converter 103 may adjust a frequency of the controlled device 104 by using the alternating current that is adjustable in frequency and voltage.

In a process where a current is transmitted from the power source 20 to the controlled device 104, current loss (also referred to as energy consumption) may occur. Generally, energy consumption of the filter circuit 101 and the main control circuit 102 is small, and thus energy consumption of the air conditioner 10 is mainly related to energy consumption of the frequency converter 103 and energy consumption of the controlled device 104.

Generally, a sum of the energy consumption of the frequency converter 103 and the energy consumption of the controlled device 104 is positively correlated to an input power of the frequency converter 103, and thus the input power of the frequency converter 103 may be used to describe the sum of the energy consumption of the frequency converter 103 and the energy consumption of the controlled device 104. The operation of the controlled device 104 is regulated by the frequency converter 103, and thus the energy consumption of the controlled device 104 is related to the frequency converter 103. The energy consumption of the frequency converter 103 mainly includes energy consumption of the rectifier sub-circuit 1031 and energy consumption of the inverter sub-circuit 1032. The energy consumption of the rectifier sub-circuit 1031 and the energy consumption of the inverter sub-circuit 1032 vary with capacity, load, and topology of the frequency converter 103. The capacity and the topology of the frequency converter 103 are related to the type of the frequency converter 103; if the type of the frequency converter 103 is determined, the capacity and the topology of the frequency converter 103 will not change; therefore, the energy consumption of the frequency converter 103 has a large correlation with the load of the frequency converter 103.

A direct factor influencing the load of the frequency converter 103 is a torque of the controlled device 104, and the torque of the controlled device 104 has a positive correlation with an output current of the frequency converter 103. Therefore, the torque of the controlled device 104 or the output current of the frequency converter 103 may be used to describe a change in the load of the frequency converter 103. That is, the torque of the controlled device 104 or the output current of the frequency converter 103 may be used to describe the energy consumption of the frequency converter 103 and may thus be used to describe the energy consumption of the air conditioner 10.

In the following embodiments, the air conditioner 10 and the method for obtaining the energy consumption of the air conditioner 10 are described respectively by taking an example where the output current of the frequency converter 103 is used to describe the energy consumption of the frequency converter 103 and obtain the energy consumption of the air conditioner 10 and taking an example where the torque of the controlled device 104 is used to describe the energy consumption of the frequency converter 103 and obtain the energy consumption of the air conditioner 10.

By taking the example where the output current of the frequency converter 103 is used to describe the energy consumption of the frequency converter 103 and obtain the energy consumption of the air conditioner 10, in a paper "Online monitoring method of air conditioning system performance based on limited measurement points" published in Journal of Refrigeration, Vol. 39, No. 6, pp. 70-76 in 2018 by Yang, Huaiyi et al., a plurality of detection points of current are proposed to be added in the circuit of the air conditioner 10, so as to use the current at the detection points to calculate an input current of the air conditioner 10 and then obtain the energy consumption of the air conditioner 10. The method provided in this paper requires a plurality of additional detection devices and has a high cost. In addition, the plurality of detection devices may bring in a test error generated by the detection devices, which may lead to a large error in the obtained energy consumption of the air conditioner 10. Therefore, the method has low detection accuracy.

The Chinese patent with the Publication No. of CN107064616A discloses a real-time power determination method of a compressor. The method includes: determining a present operating frequency of a compressor, collecting a quadrature-axis current value of the compressor in real time when the compressor operates at the present operating frequency; determining a present power coefficient corresponding to the present operating frequency according to a preset corresponding relationship of the compressor, the preset corresponding relationship including a corresponding relationship between the operating frequency and a power coefficient within an operating frequency range of the compressor; and determining a real-time power of the compressor according to the quadrature-axis current value and the present power coefficient. The real-time energy consumption of the compressor may be obtained through the real-time power of the compressor. However, the patent does not disclose a method for obtaining the energy consumption of the frequency converter 103, nor does it disclose the method for obtaining the energy consumption of the air conditioner 10.

Figure 2A:
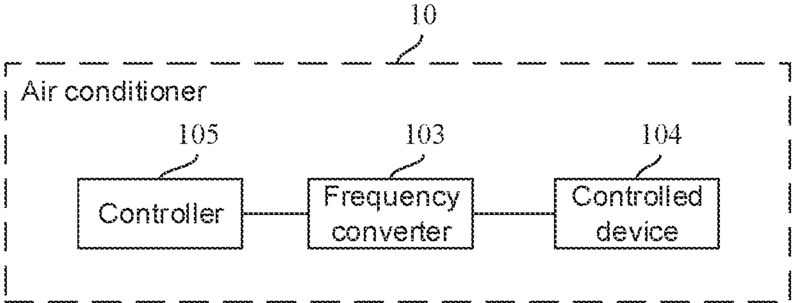
FIG. 2A is a block diagram of another air conditioner, in accordance with some embodiments.

Therefore, in some embodiments of the present disclosure, as shown in FIG. 2A, the air conditioner 10 further includes a controller 105, which may be disposed in the indoor unit or the outdoor unit. The controller 105 is connected to the frequency converter 103 and is configured to: obtain a present operating frequency of the controlled device 104 and a present output current of the frequency converter 103; obtain a present efficiency of the frequency converter 103 according to a preset function, the present operating frequency of the controlled device 104 and the present output current of the frequency converter 103, the preset function being a function of an efficiency of the frequency converter 103 with respect to an operating frequency of the controlled device 104 and an output current of the frequency converter 103; and obtain a present output power of the frequency converter 103, and obtain a present input power of the frequency converter 103 according to the present efficiency of the frequency converter 103 and the present output power of the frequency converter 103.

For example, the controlled device 104 is a compressor, and a sum of energy consumption of the compressor and the energy consumption of the frequency converter 103 is positively correlated to the input power of the frequency converter 103; and thus, as long as the present input power of the frequency converter 103 is obtained, the present energy consumption of the air conditioner 10 is obtained.

The controller 105 is or includes, for example, a central processing unit (CPU), a microprocessor, an application specific integrated circuit (ASIC), a chip, or a logic control device (e.g., a field programmable gate array (FPGA)).

Figure 2B:
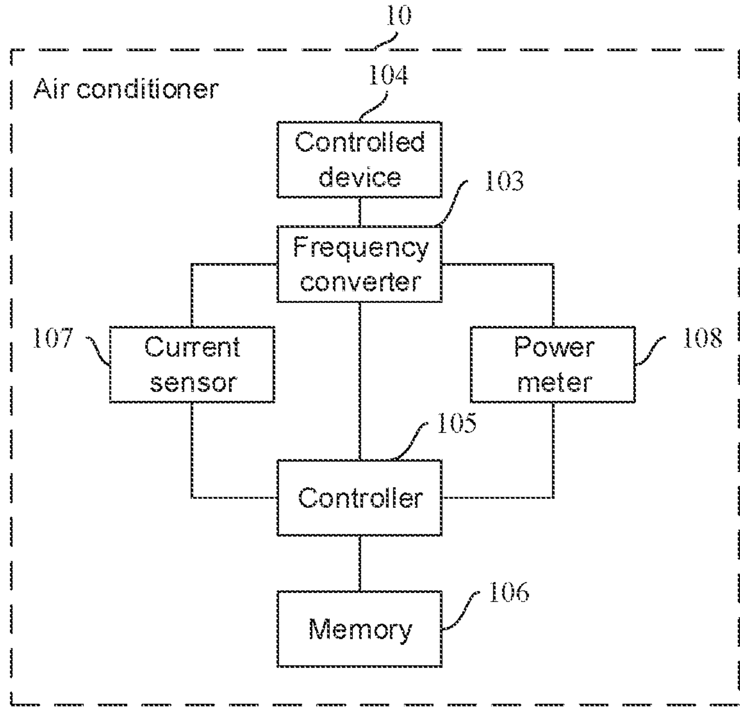
FIG. 2B is a block diagram of yet another air conditioner, in accordance with some embodiments.

For example, as shown in FIG. 2B, the air conditioner 10 may further include a current sensor 107 to detect the present output current of the frequency converter 103. The current sensor 107 may be a Hall current sensor, for example. The current sensor 107 may be disposed at an input end of the frequency converter 103 or at an output end of the frequency converter 103, and the present disclosure does not limit an arrangement position of the current sensor 107. A method for obtaining the present output current of the frequency converter 103 may be as follows. The current sensor 107 detects the present output current of the frequency converter 103 and transmits the present output current to the controller 105. The controller 105 receives the present output current from the current sensor 107, i.e., obtains the present output current of the frequency converter 103.

The present operating frequency of the controlled device 104 may be obtained according to an operating instruction of the air conditioner 10 obtained by the controller 105. For example, if the controller 105 receives an operating target temperature, an air output and an operating condition (e.g., a condition in which the air conditioner is used to reduce the indoor temperature) of the air conditioner 10 set by the user, the controller 105 may obtain operating parameters of the air conditioner 10 according to the above settings, and the operating parameters may include the present operating frequency of the controlled device 104. A method for obtaining the preset function can be obtained in a research phase, which will be described in detail below.

Therefore, the energy consumption of the air conditioner 10 may be detected without additionally adding a detection device, which simplifies difficulty and complexity of detection and avoids increasing a detection cost. In addition, since there is no need to additionally add a detection device, a test error generated by the detection device will not be brought in, thereby enhancing the detection accuracy of the energy consumption of the air conditioner.

The following exemplifies a method for obtaining the preset function, i.e., the function of the efficiency of the frequency converter 103 with respect to the operating frequency of the controlled device 104 and the output current of the frequency converter 103.

It has been found through research that the efficiency of the frequency converter 103 is related to the output current of the frequency converter 103 and the operating frequency of the controlled device 104. Therefore, relationships between the efficiency of the frequency converter 103 and the output current of the frequency converter 103 and between the efficiency of the frequency converter 103 and the operating frequency of the controlled device 104 may be obtained by obtaining data of a plurality of groups of output currents of the frequency converter 103, data of a plurality of groups of operating frequencies of the controlled device 104, and data of a plurality of groups of efficiencies of the frequency converter 103 corresponding to the output currents of the frequency converter 103 and the operating frequencies of the controlled device 104.

For example, in order to obtain the data of the plurality of groups of the output currents of frequency converter 103, the data of the plurality of groups of operating frequencies of the controlled device 104, and the data of the plurality of groups of the efficiencies of the frequency converter 103 corresponding to the output currents of the frequency converter 103 and the operating frequencies of the controlled device 104, the controller 105 is configured to: obtain at least one preset frequency in a plurality of preset frequencies, and obtain data of the output current of the frequency converter 103 corresponding to the operating frequency of the controlled device 104 and data of an efficiency of the frequency converter 103 corresponding to the operating frequency of the controlled device 104 by taking the at least one preset frequency as an operating frequency of the controlled device 104 respectively.

For example, the plurality of preset frequencies may be a plurality of frequencies preset according to intrinsic parameters of the controlled device 104. In a case where the controlled device 104 operates at the at least one preset frequency as the operating frequency respectively, the controller 105 or another device obtains the data of the output current of the frequency converter 103 corresponding to the operating frequency of the controlled device 104 and the data of the efficiency of the frequency converter 103 corresponding to the operating frequency of the controlled device 104.

For example, the at least one preset frequency may include value(s) of $f_1$ to $f_k$, where k takes a value from 1, 2, 3, . . . (k=1, 2, 3, . . . ); and in a case where a value of k changes, a value of $f_k$ changes. The frequency converter 103 may adjust an input voltage of the controlled device 104 and a frequency of the input voltage according to the operating parameters obtained by the controller 105, so as to control the controlled device 104 to operate at $f_k$ as the operating frequency. In this case, the controller 105 or another device may control the operation of the frequency converter 103 according to the operating parameters or the operating instruction of the air conditioner 10, so that the frequency converter 103 outputs different output currents. For example, the data of the output current of the frequency converter 103 may include data of $I_1$ to $I_m$, where m takes a value from 1, 2, 3, . . . (m=1, 2, 3, . . . ); and in a case where a value of m changes, a value of $I_m$ changes.

In a process of obtaining the preset function, with respect to the efficiency of the frequency converter 103, in some examples, the controller 105 is configured to: obtain an input power Pr' of the frequency converter 103 and an output power Pc' of the frequency converter 103; obtain an efficiency α' of the frequency converter 103 according to the input power Pr' of the frequency converter 103 and the output power Pc' of the frequency converter 103. For example, the efficiency α' of the frequency converter 103, which is corresponding to the operating frequency $f_k$ of the controlled device 104 and the output current $I_m$ of the frequency converter 103, may be calculated and obtained through formula (1).

$$\alpha' = \frac{Pc'}{Pr'} \tag{1}$$

For example, as shown in FIG. 2B, the frequency converter 103 may further include a power meter 108, which may be connected to the controller 105. The power meter 108 may be embedded in the frequency converter 103, and in this case, the power meter 108 may be configured to obtain the input power Pr' of the frequency converter 103 and the output power Pc' of the frequency converter 103. The power meter 108 is, for example, a thermistor-type power meter, a thermocouple-type power meter, or a crystal-detection-type power meter.

In order to obtain the preset function, the controller 105 is configured to obtain the preset function according to data of the operating frequency of the controlled device 104 (the at least one preset frequency), the data of the output current of the frequency converter 103 corresponding to the operating frequency of the controlled device 104, and the data of the efficiency of the frequency converter 103 corresponding to the operating frequency of the controlled device 104. For example, a plurality of data sets consisting of the operating frequency of the controlled device 104, the output current of the frequency converter 103, and the efficiency of the frequency converter 103 may be obtained; and in this way, a preset function g obtained from the data sets may more realistically reflect the relationships between the efficiency of the frequency converter 103 and the output current of the frequency converter 103 and between the efficiency of the frequency converter 103 and the operating frequency of the controlled device 104.

For example, the preset function may be obtained by performing a two-factor fitting on the obtained data of the output current of the frequency converter 103 corresponding to the operating frequency of the controlled device 104 and the obtained data of the efficiency of the frequency converter 103 corresponding to the operating frequency of the controlled device 104. For example, a relationship of the efficiency α' of the frequency converter 103 with respect to the output current I of the frequency converter 103 and the operating frequency f of the controlled device 104 may be expressed as the preset function g.

In some embodiments, the preset function g is a quadratic function. For example, the preset function g is a binary quadratic function, and the expression is formula (2).

$$\alpha' = a0 + a1^{*}f + a2^{*}I + a3^{*}f^{*}I + a4^{*}f^{2} + a5^{*}I^{2} \tag{2}$$

For example, values of parameters a0 to a5 may be calculated according to a principle of minimum error and the obtained data.

From the above, the expression of the preset function g may be obtained.

In some embodiments, after the preset function g is obtained, the preset function g may be stored in a storage area in the controller 105 for invocation by the controller 105. Or for example, as shown in FIG. 2B, the air conditioner 10 may further include a memory 106, which is connected to the controller 105. After the preset function g is obtained, the preset function g may also be stored in the memory 106 for invocation by the controller 105.

In some embodiments, the present output power of the frequency converter 103 is a present output active power Pc. In this case, the controller 105 is configured to: obtain the present output active power Pc of the frequency converter 103; and obtain a present input power Pr of the frequency converter 103 according to the present output active power Pc of the frequency converter 103 and the present efficiency α of the frequency converter 103. For example, the present input power Pr of the frequency converter 103 may be obtained according to formula (3).

$$Pr = \frac{Pc}{\alpha} \tag{3}$$

In some embodiments, the present output active power of the frequency converter 103 is obtained in the following manner. The controller 105 is configured to: obtain a current of the frequency converter 103 on a d axis and a current of the frequency converter 103 on a q axis; obtain a command voltage value of a frequency converter 103 on the d axis and a command voltage value of a frequency converter 103 on the q axis, the frequency converter 103 being a frequency converter after amplitude limiting according to a modulation rate; and obtain the present output active power of the frequency converter according to the current of the frequency converter on the d axis and the current of the frequency converter on the q axis, and the command voltage value of the frequency converter on the d axis and the command voltage value of the frequency converter on the q axis.

The amplitude limiting according to the modulation rate means that the frequency converter 103 may modulate power voltage according to the modulation rate to provide an operating voltage for the controlled device 104, the operating voltage of the controlled device 104 being not higher than an amplitude of the power voltage modulated by the frequency converter 103.

In some embodiments, the controller 105 is configured to obtain the present output active power Pc of the frequency converter according to formula (4).

$$Pc = \frac{3}{2} \times (Id \times Ud + Iq \times Uq) \tag{4}$$

In formula (4), Id is the current of the frequency converter on the d axis, Ud is the command voltage value of the frequency converter on the d axis, Iq is the current of the frequency converter on the q axis, and Uq is the command voltage value of the frequency converter on the q axis.

For example, formula (4) may be derived from formula (5), and for formula (5), reference may be made to the book "Electrical Technology and Electronic Technology (Volume 1)" published b Tan Qin u in Tsinghua University Press in 2007.

$$Pc = \sqrt{3} \times \frac{\sqrt{3}}{\sqrt{2}} \times V1 \times \frac{1}{\sqrt{2}} \times I1 \times \cos\theta \tag{5}$$

In the formula (5), V1 is a peak value of an output voltage of the frequency converter 103 after the amplitude limitation according to the modulation rate, and I1 is a peak value of a current of the frequency converter 103 after the amplitude limitation according to the modulation rate. The derivation process may be shown as formula (6).

$$Pc = \sqrt{3} \times \frac{\sqrt{3}}{\sqrt{2}} \times V1 \times \frac{1}{\sqrt{2}} \times I1 \times \cos\varphi = \frac{3}{2} \times V1 \times I1\cos(\theta_i - \theta_v) = \frac{3}{2} \times \{V1 \times \cos\theta_v \times I1 \times \cos\theta_i + V1 \times \sin\theta_v \times I1 \times \text{sins}\theta_i\} = \frac{3}{2} \times (Ud \times Id + Iq \times Uq) \tag{6}$$

In the above formula, φ is a phase difference between current and voltage, θ, is a phase of the current, and $\theta_v$ is a phase of the voltage.

The following exemplifies a method for obtaining the current Id of the frequency converter 103 on the d axis and the current Iq of the frequency converter 103 on the q axis; as well as a method for obtaining the command voltage value Ud on the d axis and the command voltage value Uq of on the q axis of the frequency converter 103 after the amplitude limiting according to the modulation rate.

Figure 3A:
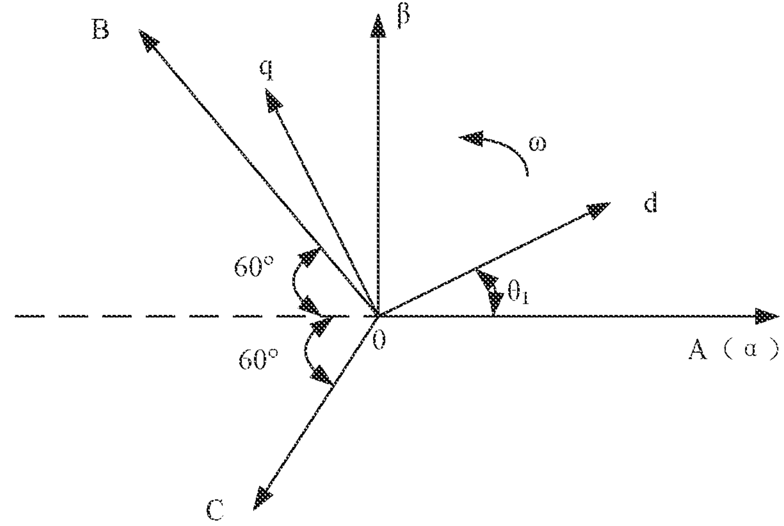
FIG. 3A is a schematic diagram of a d axis and a q axis, in accordance with some embodiments.

As shown in FIG. 3A, the A axis, the B axis, and the C axis represent axes where three-phase symmetrical stationary windings in the controlled device 104 are located respectively. The A axis, B axis, and C axis form a three-phase coordinate system, i.e., the 0ABC coordinate system. In order to simplify the calculation, the three-phase coordinate system may be simplified to a 0αβ coordinate system composed of axes where two-phase stationary windings are located (e.g., the A axis coincides with the α axis, and the β axis is perpendicular to the A axis), and then the two-phase stationary coordinate system is converted into a two-phase rotating coordinate system 0dq (the d axis is an axis in a magnetic flux direction of a magnet in the controlled device 104, and the q axis is an axis perpendicular to the d axis).

For example, according to the 0ABC coordinate system and the 0αβ coordinate system as shown in FIG. 3A, by taking an example where an effective number of turns per phase of the three-phase stationary winding is N3 and an effective number of turns per phase of the two-phase stationary winding is N2, in order to ensure that a total power before and after coordinate transformation remains unchanged, it is necessary to ensure that a turns ratio is $$\frac{N_3}{N_2} = \sqrt{\frac{2}{3}}.$$

Figure 3B:
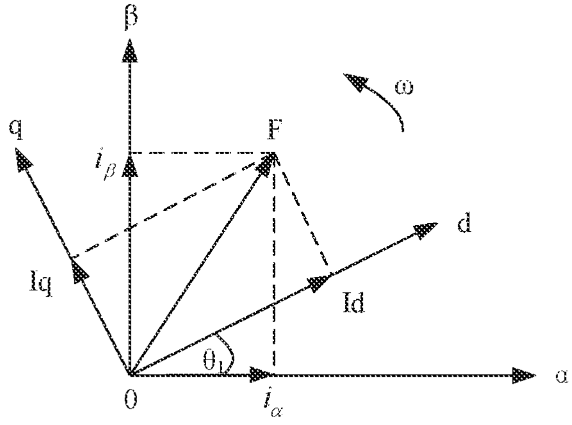
FIG. 3B is a schematic diagram of another d axis and another q axis, in accordance with some embodiments.

According to FIGS. 3A and 3B, $i_\alpha$ and $i_\beta$ may be calculated through formula (7).

$$N_2 i_\alpha = N_3 i_A - N_3 i_B \cos 60^\circ - N_3 i_C \cos 60^\circ = N_3\left(i_A - \frac{1}{2} i_B - \frac{1}{2} i_C\right) \tag{7}$$

$$N_2 i_\beta = N_3 i_B \sin 60^\circ - N_3 i_C \sin 60^\circ = \frac{\sqrt{3}}{2} N_3 (i_B - i_C)$$

By taking an example where the three-phase stationary winding is Y-connected without a naught line, $i_A$, $i_B$, and $i_C$ are each a current of each phase of three-phase alternating currents, and then $i_A+i_B+i_C=0$. Formula (8) may be obtained by substituting $$\frac{N_3}{N_2} = \sqrt{\frac{2}{3}}$$

and $i_C=-i_A-i_B$ into formula (7).

$$i_\alpha = \sqrt{\frac{3}{2}}\, i_A \tag{8}$$

$$i_\beta = \frac{1}{\sqrt{2}} i_A + \sqrt{2}\, i_B$$

As shown in FIGS. 3A and 3B, two-phase alternating currents ($i_\alpha$ and $i_\beta$) and two direct currents ($i_d$ and $i_q$) generate the same resultant magnetomotive force F. The resultant magnetomotive force F is a vector, and the d axis, the q axis, and the resultant magnetomotive force F all rotate at a rotational speed w, that is, relative positions of the resultant magnetomotive force F with respect to the d axis and the q axis do not change. Thus, components on the d axis and the q axis (i.e., $I_d$ and $I_q$) of the resultant magnetomotive force F may remain unchanged. Formula (9) may be obtained according to FIG. 3B.

$$I_d = i_\alpha \cos\theta_1 + i_\beta \sin\theta_1 \tag{9}$$

$$I_q = i_\beta \cos\theta_1 - i_\alpha \sin\theta_1$$

Formula (10) may be obtained by substituting formula (8) into formula (9).

$$I_d = \sqrt{\frac{3}{2}}\, i_A \cos\theta_1 + \left(\frac{1}{\sqrt{2}} i_A + \sqrt{2}\, i_B\right)\sin\theta_1 \tag{10}$$

$$I_q = \left(\frac{1}{\sqrt{2}} i_A + \sqrt{2}\, i_B\right)\cos\theta_1 - \sqrt{\frac{3}{2}}\, i_A \sin\theta_1$$

In formula (10), a method for obtaining the three-phase currents of $i_A$ and $i_B$ $i_B$ in is relatively simple, for example, they may be calculated through formula (11).

$$i_A = \frac{P}{\sqrt{3}\, U \cos\varphi} \tag{11}$$

In formula (11), P is a power of a motor, cos φ is a power factor of the motor, and P and cos φ are both intrinsic parameters of the motor. An included angle $\theta_1$ between the d axis and the a axis varies with time, and the included angle $\theta_1$ is related to operating parameters of both the frequency converter 103 and the controlled device 104. Therefore, the controller 105 may obtain the current Id and the current Iq according to $i_A$, $i_B$ and the included angle $\theta_1$.

After obtaining the current Id and the current Iq, the command voltage value Ud on the d axis and the command voltage value Uq on the q axis may be obtained according to the modulation rate of the frequency converter 103. For example, the command voltage value Ud on the d axis and the command voltage value Uq on the q axis may also be obtained according to a command voltage value of the frequency converter that is preset in advance.

In some other embodiments, the present output power of the frequency converter 103 is a present output apparent power of the frequency converter 103. In this case, the controller 105 is configured to: obtain a present output apparent power S2i of the frequency converter 103 and an output power factor F2i of the frequency converter 103; and obtain the present input power of the frequency converter 103 according to the present efficiency of the frequency converter 103, the present output apparent power of the frequency converter 103 and the output power factor of the frequency converter 103.

For example, the present output apparent power S2i of the frequency converter 103 may be calculated according to parameters of the frequency converter 103 (e.g., the present output apparent power S2i of the frequency converter 103 may be obtained by multiplying the present output current of the frequency converter 103 and a present output voltage of the frequency converter 103). The output power factor F2i is an intrinsic parameter of the frequency converter 103, and thus can be obtained directly. Obtaining the present input power of the frequency converter 103 according to the present efficiency of the frequency converter 103, the present output apparent power of the frequency converter 103 and the output power factor of the frequency converter 103, includes: obtaining the present input power Pr of the frequency converter 103 according to formula (12).

$$Pr = \frac{S2i * F2i}{\alpha} \tag{12}$$

In the air conditioner 10 provided by some embodiments of the present disclosure, an error of the present input power of the frequency converter 103 obtained by the controller 105 is small according to a result of the research. It can be seen that a detection accuracy of the energy consumption of the air conditioner is relatively high.

Figure 4:
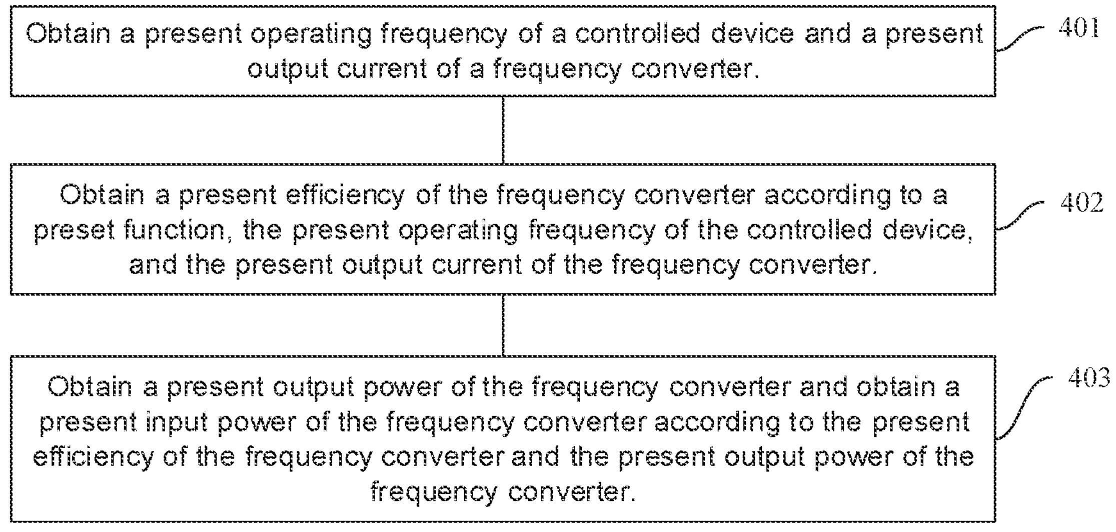
FIG. 4 is a flow diagram of a method for determining energy consumption of an air conditioner, in accordance with some embodiments.

Some embodiments of the present disclosure provide a method for determining energy consumption of an air conditioner, and the method is executed by, for example, the controller 105. As shown in FIG. 4, the method includes steps 401 to 403.

In step 401, a present operating frequency of a controlled device and a present output current of a frequency converter are obtained.

In step 402, a present efficiency of the frequency converter is obtained according to a preset function, the present operating frequency of the controlled device, and the present output current of the frequency converter.

For example, the preset function may be a function of an efficiency of the frequency converter with respect to an operating frequency of the controlled device and an output current of the frequency converter.

In step 403, a present output power of the frequency converter is obtained, and a present input power of the frequency converter is obtained according to the present efficiency of the frequency converter and the present output power of the frequency converter.

In some embodiments, the preset function is a quadratic function of the efficiency of the frequency converter with respect to the operating frequency of the controlled device and the output current of the frequency converter.

Figure 5:
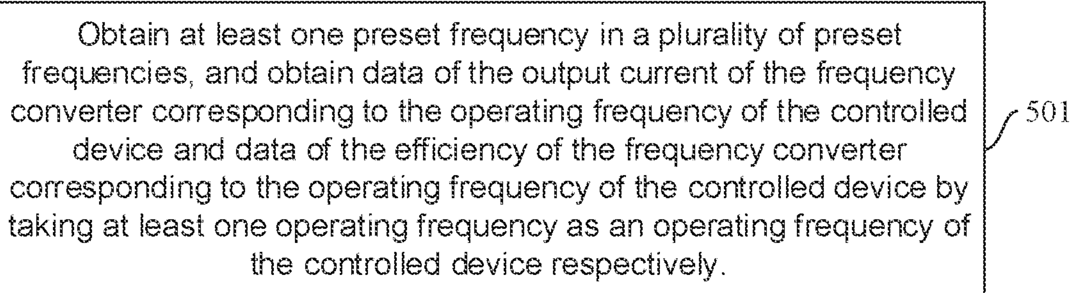
FIG. 5 is a flow diagram of another method for determining energy consumption of an air conditioner, in accordance with some embodiments.

In some embodiments, as shown in FIG. 5, before step 403, obtaining the preset function may include steps 501 to 502.

In step 501, at least one preset frequency in a plurality of preset frequencies is obtained, and data of the output current of the frequency converter corresponding to the operating frequency of the controlled device and data of the efficiency of the frequency converter corresponding to the operating frequency of the controlled device are obtained by taking at least one operating frequency as an operating frequency of the controlled device respectively.

In step 502, the preset function is obtained according to data of the operating frequency of the controlled device, data of an output current of the frequency converter corresponding to a plurality of preset frequencies of the controlled device, and data of an efficiency of the frequency converter corresponding to the plurality of preset frequencies of the controlled device.

Figure 6:
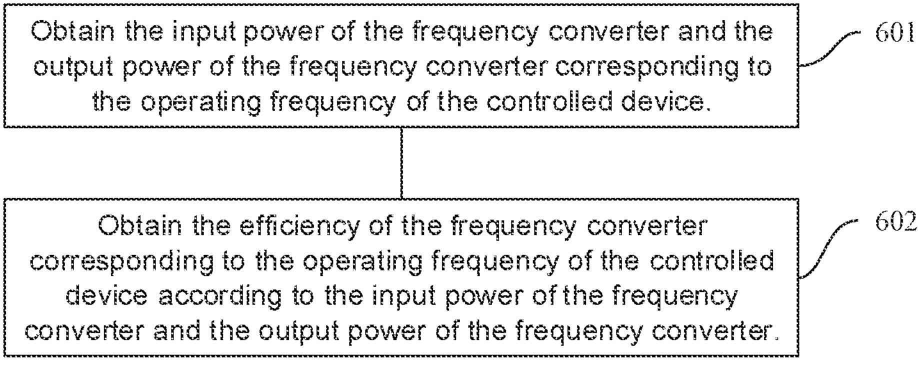
FIG. 6 is a flow diagram of yet another method for determining energy consumption of an air conditioner, in accordance with some embodiments.

In some embodiments, as shown in FIG. 6, in step 501, obtaining the data of the efficiency of the frequency converter corresponding to the operating frequency of the controlled device, may include steps 601 and 602.

In step 601, the input power of the frequency converter and the output power of the frequency converter corresponding to the operating frequency of the controlled device are obtained.

For example, step 601 may include: obtaining the input power of the frequency converter 103 and the output power of the frequency converter 103 through a power meter 108.

In step 602, the efficiency of the frequency converter corresponding to the operating frequency of the controlled device is obtained according to the input power of the frequency converter and the output power of the frequency converter.

Figure 7:
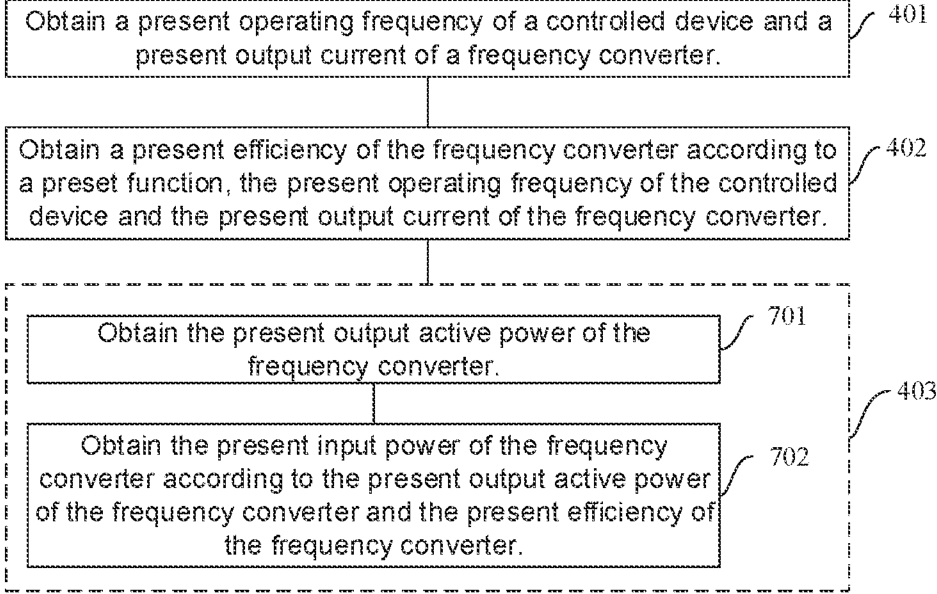
FIG. 7 is a flow diagram of yet another method for determining energy consumption of an air conditioner, in accordance with some embodiments.

In some embodiments, the present output power of the frequency converter is a present output active power of the frequency converter. As shown in FIG. 7, step 403 may include steps 701 to 702.

In step 701, the present output active power of the frequency converter is obtained.

Figure 8:
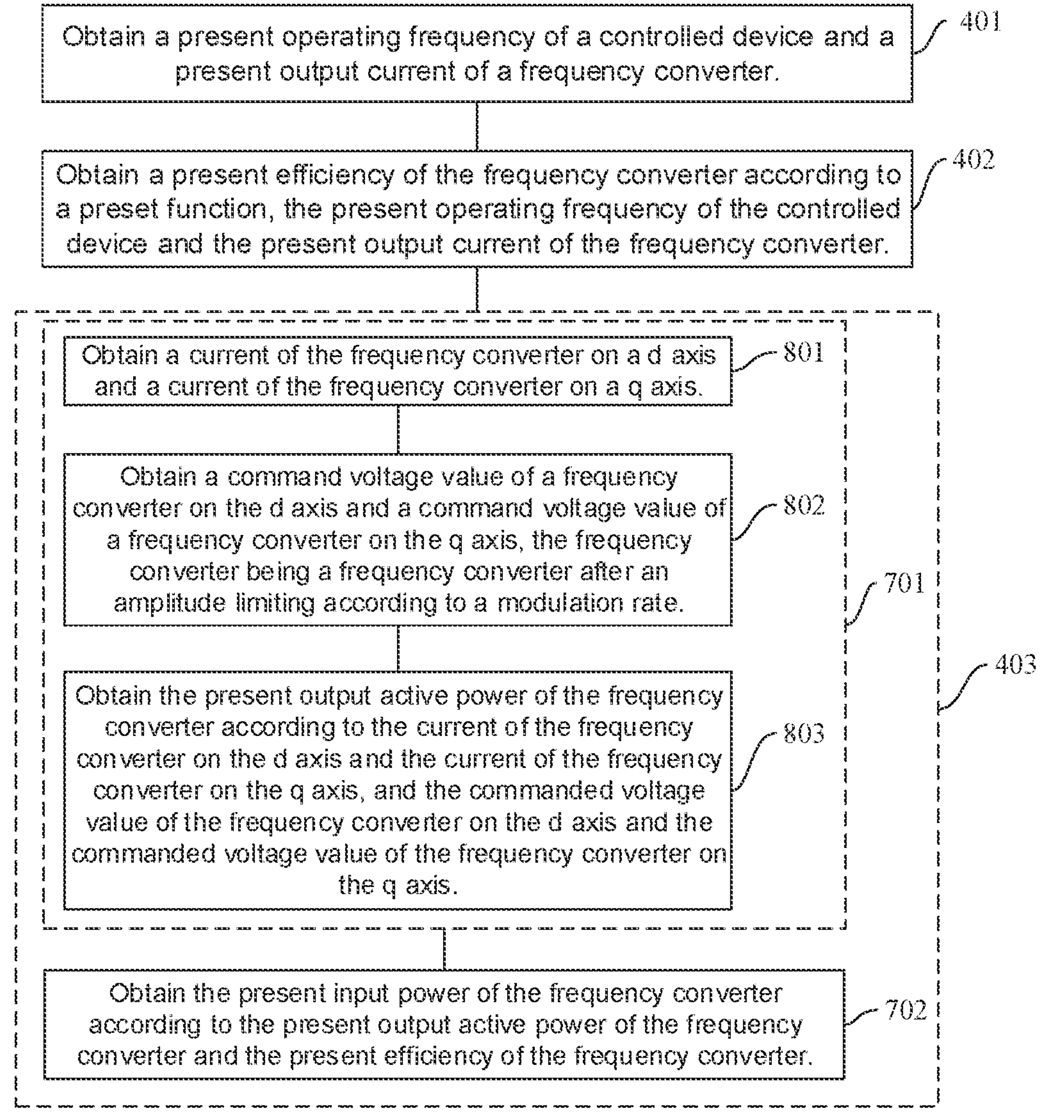
FIG. 8 is a flow diagram of yet another method for determining energy consumption of an air conditioner, in accordance with some embodiments.

For example, as shown in FIG. 8, step 701 may include steps 801 to 803.

In step 801, a current of the frequency converter on a d axis and a current of the frequency converter on a q axis are obtained.

The d axis is an axis in a magnetic flux direction of a magnet in the controlled device 104, and the q axis is an axis perpendicular to the d axis.

In step 802, a command voltage value of a frequency converter on the d axis and a command voltage value of a frequency converter on the q axis are obtained, the frequency converter being a frequency converter after amplitude limiting according to a modulation rate.

In step 803, the present output active power of the frequency converter is obtained according to the current of the frequency converter on the d axis and the current of the frequency converter on the q axis, and the commanded voltage value of the frequency converter on the d axis and the commanded voltage value of the frequency converter on the q axis.

Step 803 may include calculating the present output active power of the frequency converter according to formula (4) in the above embodiments, which will not be repeated herein.

In step 702, the present input power of the frequency converter is obtained according to the present output active power of the frequency converter and the present efficiency of the frequency converter.

Figure 9:
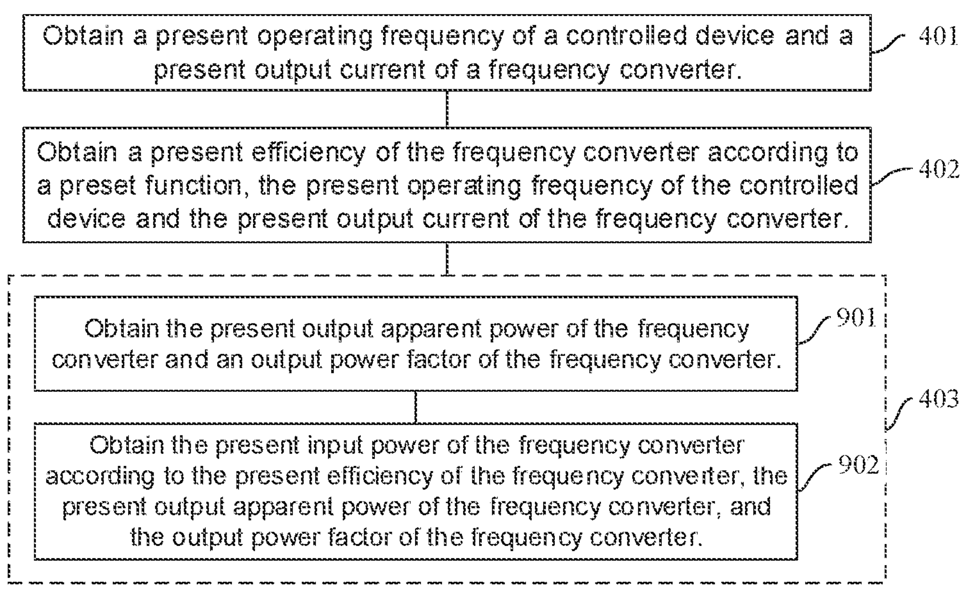
FIG. 9 is a flow diagram of yet another method for determining energy consumption of an air conditioner, in accordance with some embodiments.

In some other embodiments, the present output power of the frequency converter is a present output apparent power of the frequency converter. As shown in FIG. 9, step 403 may include steps 901 to 902.

In step 901, the present output apparent power of the frequency converter and an output power factor of the frequency converter are obtained.

In step 902, the present input power of the frequency converter is obtained according to the present efficiency of the frequency converter, the present output apparent power of the frequency converter, and the output power factor of the frequency converter.

It will be noted that, for relevant contents and beneficial effects of the method for obtaining the energy consumption of the air conditioner 10, reference may be made to the relevant contents of the air conditioner 10, and the details will not be repeated herein.

For example, a torque of the controlled device 104 is used to describe the energy consumption of the frequency converter 103 and obtain the energy consumption of the air conditioner 10. In some embodiments, the controller 105 is configured to: obtain a present operating frequency of the controlled device 104 and a present torque of the controlled device 104; and obtain the present efficiency $\alpha$ of the frequency converter 103 according to the present operating frequency of the controlled device 104 and the present torque of the controlled device 104.

Figure 10:
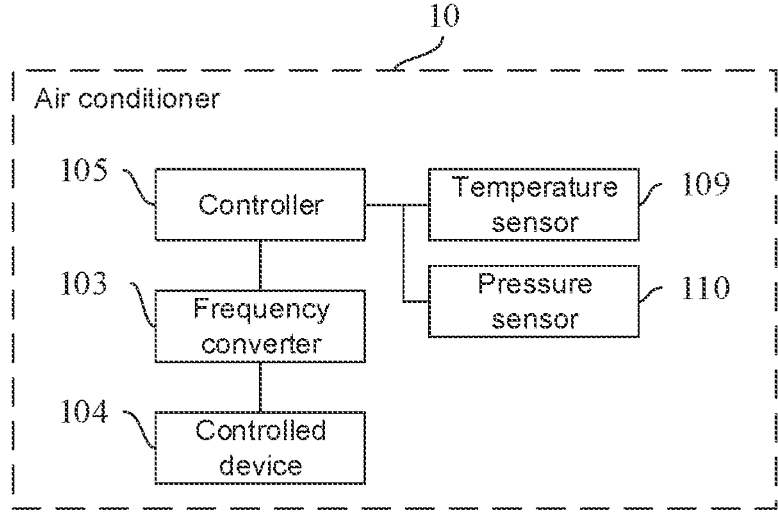
FIG. 10 is a block diagram of yet another air conditioner, in accordance with some embodiments.

During the operation of the air conditioner 10, the torque of the controlled device 104 is related to exhaust temperature, exhaust pressure, suction temperature, and suction pressure of the controlled device 104. The air conditioner 10 may include a detection device that may obtain the exhaust temperature, the exhaust pressure, the suction temperature, and the suction pressure of the controlled device 104. For example, as shown in FIG. 10, the detection device of the air conditioner 10 may include a temperature sensor 109 and a pressure sensor 110. The temperature sensor 109 measures a value of the exhaust temperature and a value of the suction temperature and transmits the measured value of the exhaust temperature and the measured value of the suction temperature to the controller 105. The pressure sensor 110 measures a value of the exhaust pressure and a value of the suction pressure and transmits the measured value of the exhaust pressure and the measured value of the suction pressure to the controller 105. The controller 105 may obtain the torque of the controlled device 104 according to the obtained values of the exhaust temperature, the exhaust pressure, the suction temperature, and the suction pressure.

The present operating frequency of the controlled device 104 may be obtained according to operating parameters of the air conditioner 10, and for the obtaining method, reference may be made to the method for obtaining the present operating frequency of the controlled device 104 in the above embodiments.

The following exemplifies an implementation for obtaining the present efficiency $\alpha$ of the frequency converter 103 according to the present operating frequency of the controlled device 104 and the present torque of the controlled device 104.

In some embodiments, the controller 105 is configured to obtain the present efficiency $\alpha$ of the frequency converter 103 according to the present operating frequency of the controlled device 104, the present torque of the controlled device 104, and a preset corresponding relationship. The preset corresponding relationship includes a corresponding relationship between the torque of the controlled device 104 and the efficiency of the frequency converter 103 at the present operating frequency of the controlled device 104.

In some embodiments, the preset corresponding relationship may be presented in a form of a table, which is exemplified below.

For example, if the preset corresponding relationship is presented in the form of a table, data in the table may include data of the operating frequency of the controlled device 104, data of a torque of the controlled device 104 corresponding to the operating frequency of the controlled device 104 and data of the efficiency of the frequency converter 103 corresponding to the operating frequency of the controlled device 104.

In order to obtain the data in the table, for example, at least one preset frequency in the plurality of preset frequencies is obtained; the frequency converter 103 adjusts an input voltage of the controlled device 104 according to the operating parameters received from the controller 105 to adjust the operating frequency of the controlled device 104, thereby controlling the controlled device 104 to operate at the at least one preset frequency respectively. In a case where the controlled device 104 operates at the at least one preset frequency as the operating frequency, the controller 105 or another device obtains the data of the torque of the controlled device 104 corresponding to the operating frequency of the controlled device 104 and the data of the efficiency of the frequency converter 103 corresponding to the operating frequency of the controlled device 104.

In some embodiments, the at least one preset frequency of the controlled device 104 includes a first preset frequency, a second preset frequency, . . . , and an M-th preset frequency, where M is an integer greater than 1. In the at least one preset frequency, a difference between two adjacent preset frequencies may be $\Delta f$, that is, the controlled device 104 may be controlled to operate every other $\Delta f$. For example, the difference $\Delta f$ between the first preset frequency and the second preset frequency is 5 Hz. That is, the controlled device 104 may be controlled to operate every other 5 Hz.

For example, in a case where the frequency converter 103 controls the controlled device 104 to operate at the first preset frequency (e.g., 115 Hz), the controller 105 or another device may control the operation of the frequency converter 103 according to the operating parameters or an operating instruction of the air conditioner 10, so that the controlled device 104 operates at different torques to obtain data of different torques of the controlled device 104 corresponding to the first preset frequency.

In order to obtain the data of different torques of the controlled device 104 corresponding to the first preset frequency, in some embodiments, the controller 105 is further configured to: obtain a density $\rho$ of a refrigerant sucked into the controlled device 104 and a rotational speed Rpm of the controlled device 104; obtain an outlet enthalpy value h1 and an inlet enthalpy value h2 of the controlled device 104; and obtain a torque n of the controlled device 104 (e.g., compressor) according to formula (13).

$$n = a \times (h1 = h2) \times \rho \times Rpm \times \eta \div b \div Rpm \tag{13}$$

In formula (13), $\eta$ is a volumetric efficiency of the controlled device 104, $\eta$ is a fixed value, and a and b are fitting parameters.

For example, the controller 105 may obtain the outlet enthalpy value h1 through a fitting method according to the exhaust temperature and the exhaust pressure of the controlled device 104, and the controller 105 may obtain the inlet enthalpy value h2 through a fitting method according to the suction temperature and the suction pressure of the controlled device 104.

To simplify the calculation, the torque n of the controlled device 104 (e.g., compressor) may also be obtained according to formula (14).

$$n = a \times (h1 - h2) \times \rho \times \eta \div b \tag{14}$$

Next, in a case where the frequency converter 103 controls the controlled device 104 to operate at the first preset frequency (e.g., 115 Hz), each time the data of the torque are obtained, the controller 105 or another device may obtain the data of the efficiency of the frequency converter 103 according to the output power of the frequency converter 103.

For example, the controller 105 is configured to obtain an input power Pr' of the frequency converter 103 and an output power Pc' of the frequency converter 103; and obtain the efficiency α' of the frequency converter 103 according to the input power Pr' of the frequency converter 103 and the output power Pc' of the frequency converter 103. For example, the efficiency of the frequency converter 103 may be calculated through formula (1).

For example, the input power Pr' of the frequency converter 103 may be directly measured at the input end of the frequency converter 103 through a power meter, and the output power Pc' of the frequency converter 103 may be obtained at the output end of the frequency converter 103 through the power meter.

Next, a first table may be generated according to the operating frequency of the controlled device 104 (the first preset frequency), data of a torque of the controlled device 104 corresponding to the first preset frequency, and data of an efficiency of the frequency converter 103 corresponding to the first preset frequency, so that a corresponding relationship between the efficiency of the frequency converter 103 and the torque of the controlled device 104 is presented in a case where the operating frequency of the controlled device 104 is the first preset frequency.

Similarly, in a case where the frequency converter 103 controls the controlled device 104 to operate at the second preset frequency (e.g., 110 Hz), data of a torque of the controlled device 104 corresponding to the second preset frequency and data of an efficiency of the frequency converter 103 corresponding to the second preset frequency may also be obtained by the above method; and a second table is generated to present a corresponding relationship between the efficiency of the frequency converter 103 and the torque of the controlled device 104 in a case where the operating frequency of the controlled device 104 is the second preset frequency.

In some other embodiments, the above corresponding relationship is presented in a form of a function obtained by fitting the table, which will be exemplified below.

In a case where the operating frequency of the controlled device 104 is one of the at least one preset frequency, in order to obtain a complete corresponding relationship between the torque of the controlled device 104 and the efficiency of the frequency converter 103, the controller 105 or another device may obtain a function of the corresponding relationship between the efficiency $\alpha_f$ of the frequency converter 103 and the torque $n_f$ of the controlled device 104 by means of data fitting.

For example, the operating frequency of the controlled device 104 is marked as f (e.g., f is 115 Hz), the efficiency of the frequency converter 103 corresponding to the operating frequency f of the controlled device 104 is marked as $\alpha_f$, and the torque of the controlled device 104 corresponding to the operating frequency f of the controlled device 104 is marked as $n_f$; the function y of the efficiency $\alpha_f$ of the frequency converter 103 with respect to the torque $n_f$ of the controlled device 104 may be obtained by means of data fitting, and an expression of the function y may be as shown in formula (15).

$$\alpha_f = b0 + b1^* n_f - b2^* n_f^2 \tag{15}$$

In formula (15), values of parameters b0 to b2 may be calculated according to the principle of minimum error and the obtained data.

By virtue of the above method, in a case where the operating frequency of the controlled device 104 is one of the at least one preset frequency, the complete corresponding relationship (the function y) between the torque of the controlled device 104 and the efficiency of the frequency converter 103 may be obtained. In this case, the controller 105 is configured to: obtain the present operating frequency of the controlled device 104 and the present torque of the controlled device 104; and obtain the present efficiency of the frequency converter 103 according to the functional relationship between the efficiency of the frequency converter 103 and the torque of the controlled device 104 at the present operating frequency of the controlled device 104.

Since the number of the at least one preset frequency is limited, if the present operating frequency f of the controlled device 104 cannot be found in the at least one preset frequency, the controller 105 is configured to: search for two preset frequencies adjacent to the present operating frequency of the controlled device 104 in the at least one preset frequency; obtain data of two efficiencies of the frequency converter 103 according to both the obtained corresponding relationship between the torque of the controlled device 104 and the efficiency of the frequency converter 103 in a case where the operating frequency of the controlled device 104 is the two preset frequencies respectively and the present torque of the controlled device 104; and obtain the present efficiency of the frequency converter 103 according to the data of the two efficiencies of the frequency converter 103.

For example, the controller 105 is configured to: search for two preset frequencies f1 and f2 adjacent to the present operating frequency f of the controlled device 104, in a case where the operating frequency of the controlled device 104 is f1, the corresponding relationship between the torque of the controlled device 104 and the efficiency of the frequency converter 103 being expressed as a function $\alpha_{f1}=y(n_{f1})$, and in a case where the operating frequency of the controlled device 104 is f2, the corresponding relationship between the torque of the controlled device 104 and the efficiency of the frequency converter 103 being expressed as a function $\alpha_{f2}=y(n_{f2})$; substitute the obtained present torque $n_f$ of the controlled device 104 into the function $\alpha_{f1}=y(n_{f1})$ to obtain the efficiency $\alpha_1$ of the frequency converter 103; substitute the obtained present torque $n_f$ of the controlled device 104 into the function $\alpha_{f2}=y(n_{f2})$ to obtain the efficiency $\alpha_2$ of the frequency converter 103; and obtain the efficiency $\alpha_f$ of the frequency converter 103 corresponding to the present operating frequency f and the present torque $n_f$ of the controlled device 104.

For example, if the present operating frequency f of the controlled device 104 is between the maximum value and the minimum value of the at least one preset frequency, two preset frequencies f1 and f2 adjacent to the present operating frequency f of the controlled device 104 are selected in a case where $f1<f<f2$ or $f2<f<f1$. If the present operating frequency f of the controlled device 104 is the minimum value of the at least one preset frequency, two preset frequencies f1 and f2 adjacent to the present operating frequency f of the controlled device 104 are selected in a case where $f<f1<f2$ or $f<f2<f1$. If the present operating frequency f of the controlled device 104 is the maximum value of the at least one preset frequency, two preset frequencies f1 and f2 adjacent to the present operating frequency f of the controlled device 104 are selected in a case where $f2<f1<f$ or $f1<f2<f$.

In a case where the controlled device 104 has the same torque and the two preset frequencies of the controlled device 104 differ less, a change of the efficiency of the frequency converter 103 may be equivalent to a linear change. In some embodiments, in order to simplify the calculation and reduce the amount of calculation, a linear interpolation method may be used to calculate the efficiency $\alpha_f$ of the frequency converter 103 corresponding to the present operating frequency f and the present torque $n_f$ of the controlled device 104.

For example, the linear interpolation method may be implemented by formula (16).

$$\left(\frac{\alpha_1-\alpha_f}{\alpha_f-\alpha_2}\right)=\left(\frac{f1-f}{f-f2}\right) \quad (16)$$

In some other embodiments, in order to obtain the efficiency of the frequency converter 103 more conveniently, corresponding relationships between the operating frequency of the controlled device 104, the data of the torque of the controlled device 104 corresponding to the operating frequency of the controlled device 104, and the data of the efficiency of the frequency converter 103 corresponding to the operating frequency of controlled device 104 may be obtained. For example, the controller 105 or another device may fit the efficiency α of the frequency converter 103 as a function z with respect to two factors, i.e., the operating frequency f of the controlled device 104 and the torque n of the controlled device 104.

In some embodiments, the function z is a quadratic function. For example, the function z is a binary quadratic function, an expression of which may be formula (17).

$$\alpha=c0^{*}f+c1^{*}n+c2^{*}f^{*}n+c3^{*}f^{2}+c^{4*}n^{2} \quad (17)$$

For example, values of parameters c0 to c4 may be calculated according to the principle of minimum error and the obtained data.

In a case where the function z of the efficiency of the frequency converter 103 with respect to the operating frequency of the controlled device 104 and the torque of the controlled device 104 is obtained, the controller 105 is configured to: obtain the present operating frequency of the controlled device 104 and the present torque of the controlled device 104; and obtain the present efficiency of the frequency converter 103 according to the present operating frequency of the controlled device 104, the present torque of the controlled device 104, and the function of the efficiency of the frequency converter 103 with respect to the operating frequency of the controlled device 104 and the torque of the controlled device 104.

In this way, after obtaining the present operating frequency of the controlled device 104 and the present torque of the controlled device 104, the controller 105 directly obtains the efficiency α of the frequency converter 103 according to formula (17), which is more convenient.

According to the above contents, it can be seen that after obtaining the present efficiency of the frequency converter 103 corresponding to the operating frequency of the controlled device 104, the controller 105 obtains the present input power Pr of the frequency converter 103 according to the present efficiency of the frequency converter 103 and the present output power of the frequency converter 103.

In some embodiments, the present output power of the frequency converter 103 includes the output active power of the frequency converter 103, and for a manner in which the controller 105 obtains the present input power of the frequency converter according to the output active power of the frequency converter 103, reference may be made to relevant contents of steps 701 to 702 and steps 801 to 803 in the above embodiments, and the details will not be repeated herein.

In some other embodiments, the present output power of the frequency converter 103 includes an output apparent power of the frequency converter 103, and for a manner in which the controller 105 obtains the present input power of the frequency converter according to the output apparent power of the frequency converter 103, reference may be made to relevant contents of steps 901 to 902 in the above embodiments, and the details will not be repeated herein.

Figure 11:
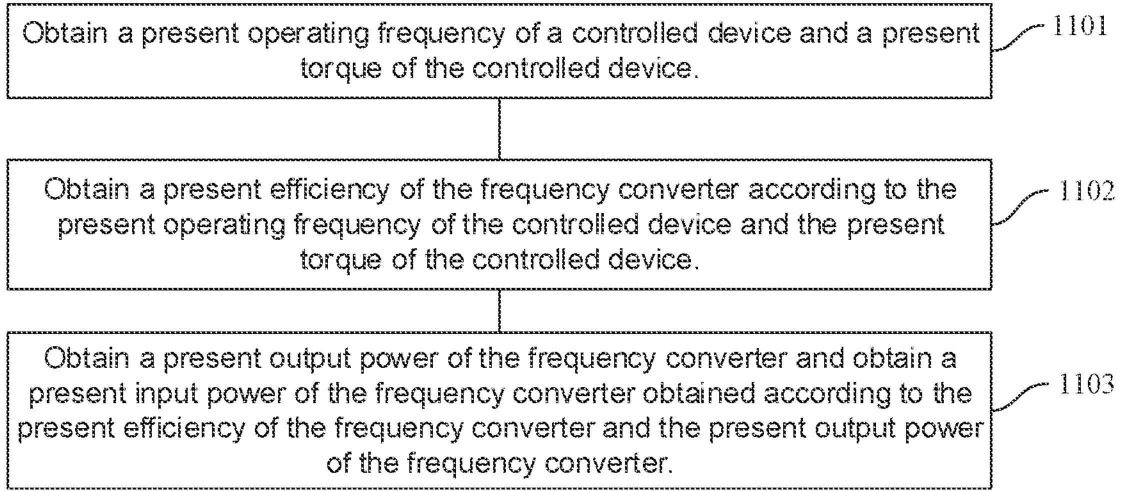
FIG. 11 is a flow diagram of yet another method for determining energy consumption of an air conditioner, in accordance with some embodiments.

Some embodiments of the present disclosure provide a method for determining energy consumption of an air conditioner, and the method is applied to an air conditioner 10. For example, as shown in FIG. 10, the air conditioner 10 includes a frequency converter 103, a controlled device 104 and a controller 105. The method is executed by, for example, the controller 105. As shown in FIG. 11, the method includes steps 1101 to 1103.

In step 1101, a present operating frequency of a controlled device and a present torque of the controlled device are obtained.

In step 1102, a present efficiency of the frequency converter is obtained according to the present operating frequency of the controlled device and the present torque of the controlled device.

In step 1103, a present output power of the frequency converter is obtained, and a present input power of the frequency converter is obtained according to the present efficiency of the frequency converter and the present output power of the frequency converter.

In some embodiments, the method further includes: obtaining the present efficiency of the frequency converter according to the present operating frequency of the controlled device, the present torque of the controlled device, and a preset corresponding relationship. The preset corresponding relationship includes a corresponding relationship between a torque of the controlled device and an efficiency of the frequency converter in a case where an operating frequency of the controlled device is one of at least one preset frequency.

Figure 12:
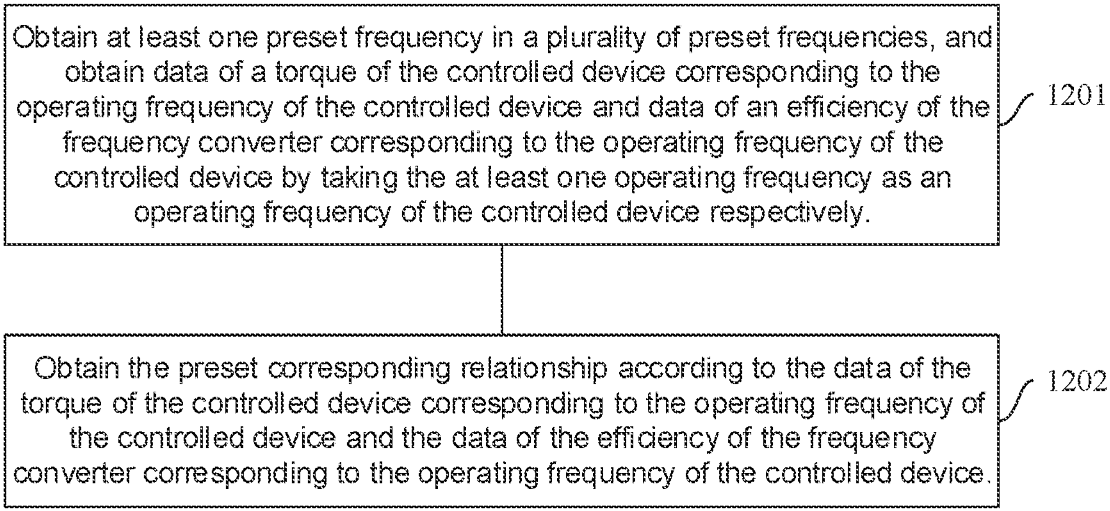
FIG. 12 is a flow diagram of yet another method for determining energy consumption of an air conditioner, in accordance with some embodiments.

For example, as shown in FIG. 12, obtaining the preset corresponding relationship may include steps 1201 to 1202.

In step 1201, at least one preset frequency in a plurality of preset frequencies is obtained, and by taking the at least one operating frequency as an operating frequency of the controlled device respectively, data of a torque of the controlled device corresponding to the operating frequency of the controlled device and data of an efficiency of the frequency converter corresponding to the operating frequency of the controlled device are obtained.

In step 1202, the preset corresponding relationship is obtained according to the data of the torque of the controlled device corresponding to the operating frequency of the controlled device and the data of the efficiency of the frequency converter corresponding to the operating frequency of the controlled device.

In some embodiments, in step 1201, a difference between every two adjacent operating frequencies in the at least one preset frequency may be Δf, which may be any positive number.

Figure 13:
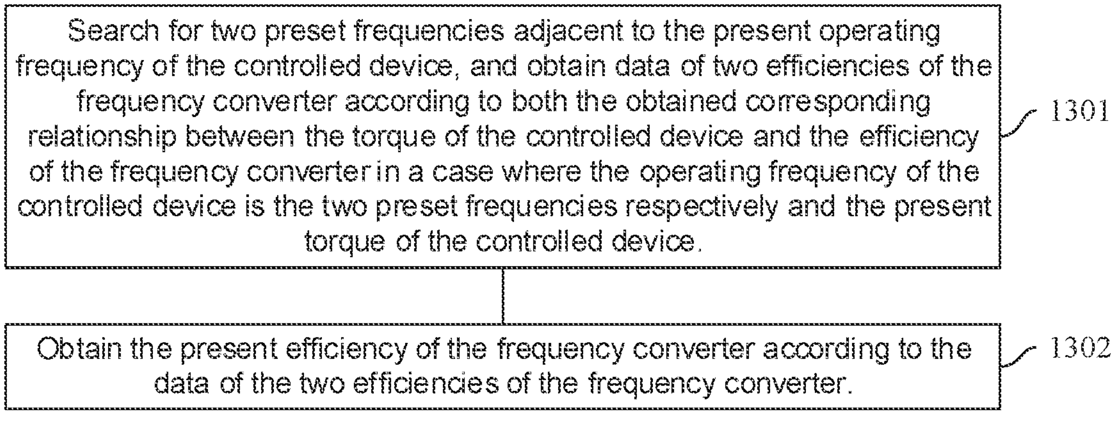
FIG. 13 is a flow diagram of yet another method for determining energy consumption of an air conditioner, in accordance with some embodiments.

In some embodiments, as shown in FIG. 13, if there is no present operating frequency of the controlled device in the at least one preset frequency, the method further includes steps 1301 to 1302.

In step 1301, two preset frequencies adjacent to the present operating frequency of the controlled device are searched for, and data of two efficiencies of the frequency converter are obtained according to both the obtained corresponding relationship between the torque of the controlled device and the efficiency of the frequency converter in a case where the operating frequency of the controlled device 104 is the two preset frequencies respectively and the present torque of the controlled device 104.

In step 1302, the present efficiency of the frequency converter is obtained according to the data of the two efficiencies of the frequency converter.

For example, step 1301 may further include: obtaining the present efficiency of the frequency converter through a linear interpolation method according to the data of the two efficiencies of the frequency converter. For relevant contents, reference may be made to the above embodiments.

In some embodiments, the preset corresponding relationship includes a functional relationship of the efficiency of the frequency converter with respect to the operating frequency of the controlled device and the torque of the controlled device.

Figure 14:
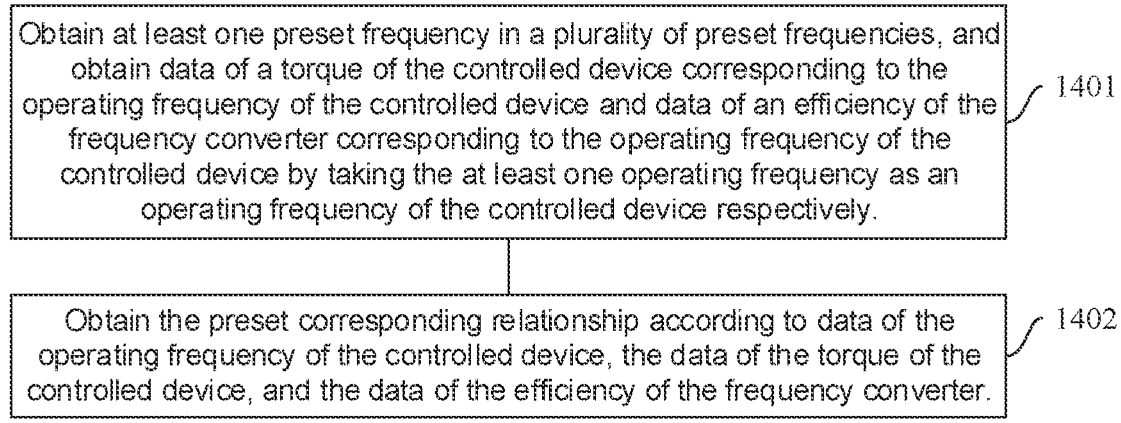
FIG. 14 is a flow diagram of yet another method for determining energy consumption of an air conditioner, in accordance with some embodiments.

For example, as shown in FIG. 14, obtaining the preset corresponding relationship may include steps 1401 to 1402.

In step 1401, at least one preset frequency in a plurality of preset frequencies is obtained, and by taking the at least one operating frequency as an operating frequency of the controlled device respectively, data of a torque of the controlled device corresponding to the operating frequency of the controlled device and data of an efficiency of the frequency converter corresponding to the operating frequency of the controlled device are obtained.

In step 1402, the preset corresponding relationship is obtained according to data of the operating frequency of the controlled device, the data of the torque of the controlled device and the data of the efficiency of the frequency converter.

For example, the data of the operating frequency of the controlled device may include at least one operating frequency. The preset corresponding relationship may be a function of the efficiency of the frequency converter with respect to the operating frequency of the controlled device and the torque of the controlled device.

In some embodiments, the function of the efficiency of the frequency converter with respect to the operating frequency of the controlled device and the torque of the controlled device is a quadratic function.

In some embodiments, for a method for obtaining the torque of the controlled device, reference may be made to the relevant contents of formula (13) and formula (14) in the above embodiments, and the details will not be repeated herein.

Figure 15:
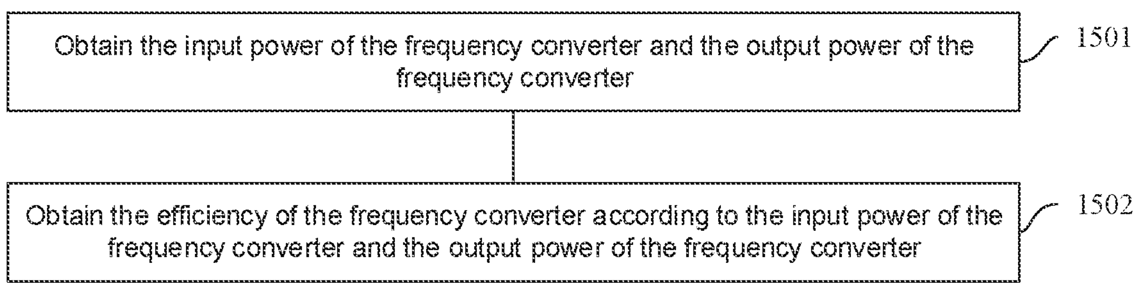
FIG. 15 is a flow diagram of yet another method for determining energy consumption of an air conditioner, in accordance with some embodiments.

In some embodiments, as shown in FIG. 15, in step 1201 or step 1401, obtaining the data of the efficiency of the frequency converter corresponding to the operating frequency of the controlled device may include steps 1501 and 1502.

In step 1501, an input power of the frequency converter and an output power of the frequency converter are obtained.

For example, step 1501 may include obtaining the input power of the frequency converter and the output power of the frequency converter through a power meter.

In step 1502, the efficiency of the frequency converter is obtained according to the input power of the frequency converter and the output power of the frequency converter.

In some embodiments, the present output power of the frequency converter is a present output active power of the frequency converter. For an implementation of step 1103, reference may be made to relevant contents of steps 701 to 702 and steps 801 to 803 in the above embodiments, and the details will not be repeated herein.

In some other embodiments, the present output power of the frequency converter is the present output apparent power of the frequency converter. For the implementation of step 1103, reference may be made to the relevant contents of steps 901 to 902 in the above embodiments, and the details will not be repeated herein.

It will be noted that, for relevant contents and beneficial effects of the method for determining the energy consumption of the air conditioner, reference may be made to the relevant contents of the foregoing air conditioner, and the details will not be repeated herein.

Some embodiments of the present disclosure provide a non-transitory computer-readable storage medium having stored computer program instructions that, when executed by a processor (e.g., a controller of an air conditioner), cause the processor to execute the method for determining the energy consumption of the air conditioner as described in any of the above embodiments.

For example, the non-transitory computer-readable storage medium may include, but is not limited to: a magnetic storage device (e.g., a hard disk, a floppy disk or a magnetic tape), an optical disk (e.g., a compact disk (CD) or a digital versatile disk (DVD)), a smart card, or a flash memory device (e.g., an erasable programmable read-only memory (EPROM), a card, a stick or a key drive). The various non-transitory computer-readable storage media described in the present disclosure may represent one or more devices for storing information and/or other machine-readable storage media for storing information.

Some embodiments of the present disclosure further provide a computer program product. The computer program product includes computer program instructions stored on a non-transitory computer-readable storage medium. The computer program instructions that, when executed by a processor (e.g., a controller of an air conditioner), cause the processor to execute the method for determining the energy consumption of the air conditioner as described in the above embodiments.

Beneficial effects of the non-transitory computer-readable storage medium and the computer program product are the same as those of the method for determining the energy consumption of the air conditioner described in some of the above embodiments, which will not be repeated herein.

The above embodiments are only used to illustrate the technical solutions of the present disclosure, but not to limit the present disclosure; although the present disclosure has been described in detail with reference to the above embodiments, those of ordinary skill in the art can still amend the technical solutions described in the above embodiments, or equivalents may be substituted for some of the technical features thereof; however, these amendments or substitutions do not make the essence of the corresponding technical solutions deviate from the spirit and scope of the technical solutions claimed in the present disclosure.

What is claimed is:

1. An air conditioner, comprising:

a controlled device;

a frequency converter connected to the controlled device and configured to regulate an operating frequency of the controlled device; and a controller connected to the frequency converter and configured to:

determine a present operating frequency of the controlled device, and a present output current and a present output power of the frequency converter;

determine a present efficiency of the frequency converter according to a preset function, the present operating frequency of the controlled device and the present output current of the frequency converter, wherein the preset function is a function of an efficiency of the frequency converter with respect to the operating frequency of the controlled device and an output current of the frequency converter; and determine a present input power of the frequency converter according to the present efficiency of the frequency converter and the present output power of the frequency converter;

wherein the controller is further configured to:

determine data of the output current of the frequency converter corresponding to the operating frequency of the controlled device and data of the efficiency of the frequency converter corresponding to the operating frequency of the controlled device by taking a plurality of preset frequencies as an operating frequency of the controlled device respectively; and determine the preset function according to data of the operating frequency of the controlled device, the data of the output current of the frequency converter corresponding to the operating frequency of the controlled device, and the data of the efficiency of the frequency converter corresponding to the operating frequency of the controlled device.

2. The air conditioner according to claim 1, wherein the present output power of the frequency converter includes a present output active power of the frequency converter, and the controller is configured to:

determine the present output active power of the frequency converter; and determine the present input power of the frequency converter according to the present output active power of the frequency converter and the present efficiency of the frequency converter.

3. The air conditioner according to claim 2, wherein the controller is configured to:

determine a current of the frequency converter on a d axis and a current of the frequency converter on a q axis, the d axis being an axis in a magnetic flux direction of a magnet in the controlled device, and the q axis being an axis perpendicular to the d axis;

determine a command voltage value of a frequency converter on the d axis and a command voltage value of a frequency converter on the q axis, the frequency converter being a frequency converter after amplitude limiting according to a modulation rate; and determine the present output active power of the frequency converter according to the current of the frequency converter on the d axis and the current of the frequency converter on the q axis, and the command voltage value of the frequency converter on the d axis and the command voltage value of the frequency converter on the q axis.

4. The air conditioner according to claim 3, wherein the controller is configured to:

determine the present output active power Pc of the frequency converter according to a formula $Pc=3/2\times(Id\times Ud+Iq\times Uq)$, where Id is the current of the frequency converter on the d axis, Ud is the command voltage value of the frequency converter on the d axis, Iq is the current of the frequency converter on the q axis, and Uq is the command voltage value of the frequency converter on the q axis.

5. The air conditioner according to claim 1, wherein the present output power of the frequency converter includes a present output apparent power of the frequency converter, and the controller is configured to:

determine the present output apparent power of the frequency converter and an output power factor of the frequency converter; and determine the present input power of the frequency converter according to the present efficiency of the frequency converter, the present output apparent power of the frequency converter, and the output power factor of the frequency converter.

6. The air conditioner according to claim 5, wherein the controller is configured to:

determine the present input power Pr of the frequency converter according to a formula $$Pr = \frac{S2i \times F2i}{\alpha},$$

where S2i is the output power factor of the frequency converter, F2i is the present output apparent power of the frequency converter, and α is the present efficiency of the frequency converter.

7. The air conditioner according to claim 1, wherein the controller is configured to:

determine an input power of the frequency converter and an output power of the frequency converter corresponding to the operating frequency of the controlled device; and determine the efficiency of the frequency converter corresponding to the operating frequency of the controlled device according to the input power of the frequency converter and the output power of the frequency converter.

8. The air conditioner according to claim 7, wherein the preset function is a quadratic function.

9. A method for determining energy consumption of the air conditioner according to claim 1, the method being executed by the controller of the air conditioner, the method comprising:

determining the present operating frequency of the controlled device, and the present output current and the present output power of the frequency converter;

determining the present efficiency of the frequency converter according to the preset function, the present operating frequency of the controlled device and the present output current of the frequency converter; and determining the present input power of the frequency converter according to the present efficiency of the frequency converter and the present output power of the frequency converter;

wherein before determining the present efficiency of the frequency converter according to the preset function, the present operating frequency of the controlled device and the present output current of the frequency converter, the method further comprises:

determining the data of the output current of the frequency converter corresponding to the operating frequency of the controlled device and the data of the efficiency of the frequency converter corresponding to the operating frequency of the controlled device by taking the plurality of preset frequencies as the operating frequency of the controlled device respectively; and determining the preset function according to the data of the operating frequency of the controlled device, the data of the output current of the frequency converter corresponding to the operating frequency of the controlled device, and the data of the efficiency of the frequency converter corresponding to the operating frequency of the controlled device.

10. The method according to claim 9, wherein determining the data of the efficiency of the frequency converter corresponding to the operating frequency of the controlled device, includes:

determining an input power of the frequency converter and an output power of the frequency converter corresponding to the operating frequency of the controlled device; and determining the efficiency of the frequency converter corresponding to the operating frequency of the controlled device according to the input power of the frequency converter and the output power of the frequency converter.

11. The method according to claim 9, wherein the preset function is a quadratic function.

12. The method according to claim 9, wherein determining the present output power of the frequency converter, and determining the present input power of the frequency converter according to the present efficiency of the frequency converter and the present output power of the frequency converter, includes:

determining a present output active power of the frequency converter; and determining the present input power of the frequency converter according to the present output active power of the frequency converter and the present efficiency of the frequency converter.

13. The method according to claim 12, wherein determining the present output active power of the frequency converter, includes:

determining a current of the frequency converter on a d axis and a current of the frequency converter on a q axis, the d axis being an axis in a magnetic flux direction of a magnet in the controlled device, and the q axis being an axis perpendicular to the d axis;

determining a command voltage value of the frequency converter on the d axis and a command voltage value of the frequency converter on the q axis, the frequency converter being a frequency converter after amplitude limiting according to a modulation rate; and determining the present output active power of the frequency converter according to the current of the frequency converter on the d axis and the current of the frequency converter on the q axis, and the command voltage value of the frequency converter on the d axis, and the command voltage value of the frequency converter on the q axis.

14. The method according to claim 13, wherein determining the present output active power of the frequency converter according to the current of the frequency converter on the d axis and the current of the frequency converter on the q axis, and the command voltage value of the frequency converter on the d axis and the command voltage value of the frequency converter on the q axis, includes:

determining the present output active power Pc of the frequency converter according to a formula $Pc=\frac{3}{2}\times(Id\times Ud+Iq\times Uq)$, where Id is the current of the frequency converter on the d axis, Ud is the command voltage value of the frequency converter on the d axis, Iq is the current of the frequency converter on the q axis, and Uq is the command voltage value of the frequency converter on the q axis.

15. The method according to claim 9, wherein determining the present output power of the frequency converter, and determining the present input power of the frequency converter according to the present efficiency of the frequency converter and the present output power of the frequency converter, includes:

determining a present output apparent power of the frequency converter and an output power factor of the frequency converter; and determining the present input power of the frequency converter according to the present efficiency of the frequency converter, the present output apparent power of the frequency converter, and the output power factor of the frequency converter.

16. The method according to claim 15, wherein determining the present input power of the frequency converter according to the present efficiency of the frequency converter, the present output apparent power of the frequency converter, and the output power factor of the frequency converter, includes:

determining the present input power Pr of the frequency converter according to a formula $$Pr = \frac{S2i \times F2i}{\alpha},$$

where S2i is the output power factor of the frequency converter, F2i is the present output apparent power of the frequency converter, and α is the present efficiency of the frequency converter.

* * * * *